April 26, 1966     A. HANSSON ETAL     3,247,583
PRODUCTION OF EXTERNALLY FINNED SHEET STOCK
Filed March 21, 1962     4 Sheets-Sheet 1
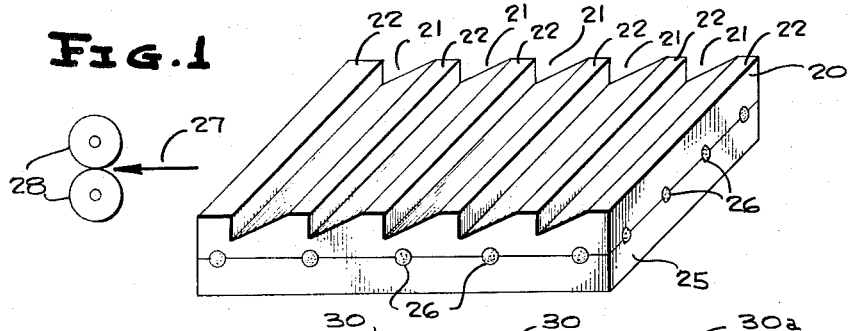
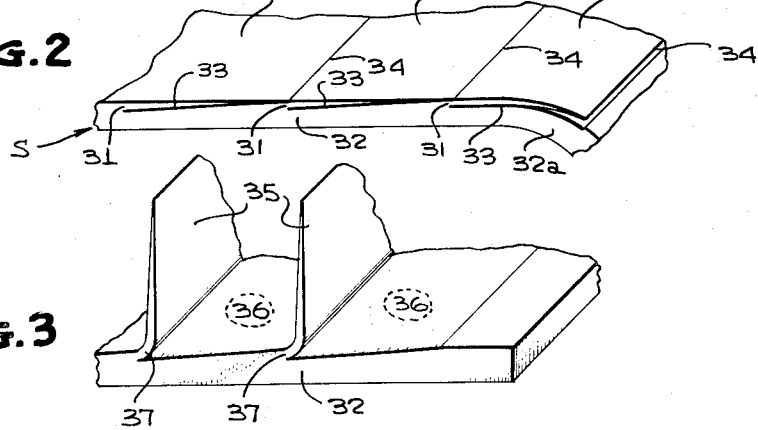
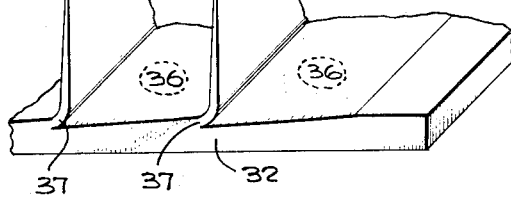
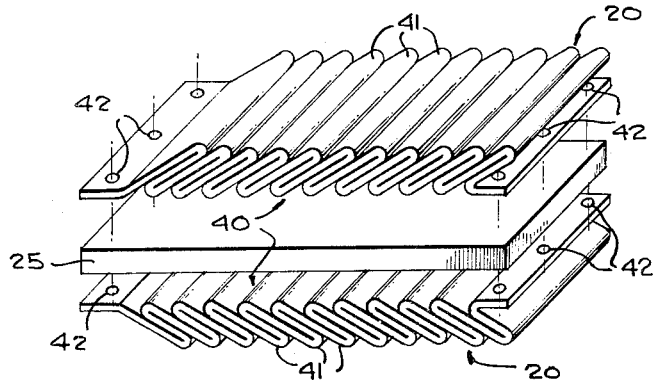
INVENTORS
ANTS HANSSON
& ROBERT M. BRICK
BY Mason, Porter, Diller & Stewart
ATTORNEYS

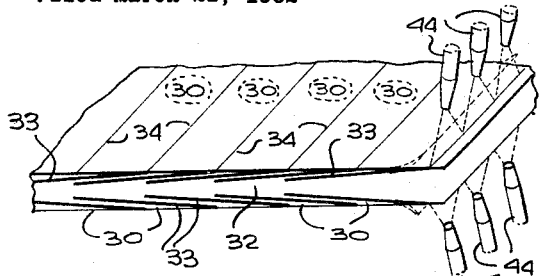
Fig.5
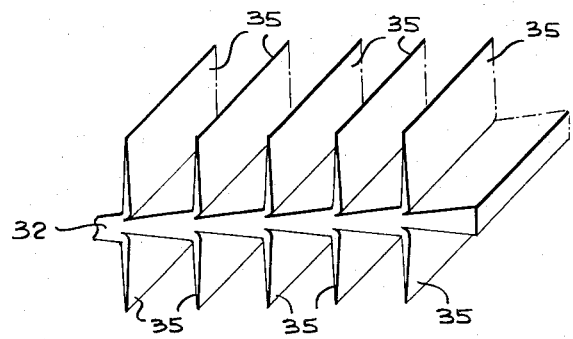
Fig.6
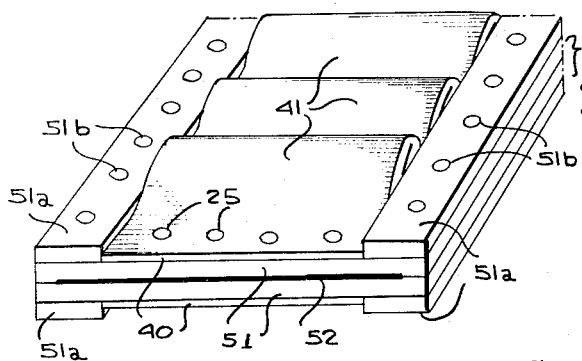
Fig.7
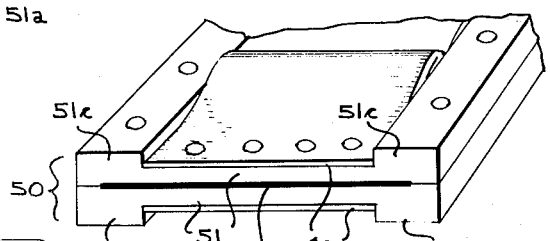
Fig.7-A
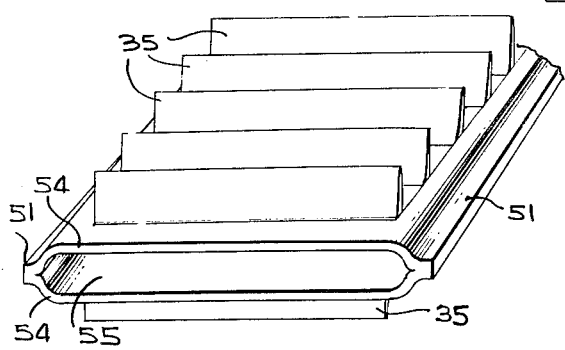
Fig.8
INVENTORS
ANTS HANSSON
& ROBERT M. BRICK
BY *Mason, Porter, Diller & Stewart*,
ATTORNEYS April 26, 1966 A. HANSSON ETAL 3,247,583
PRODUCTION OF EXTERNALLY FINNED SHEET STOCK
Filed March 21, 1962 4 Sheets-Sheet 4
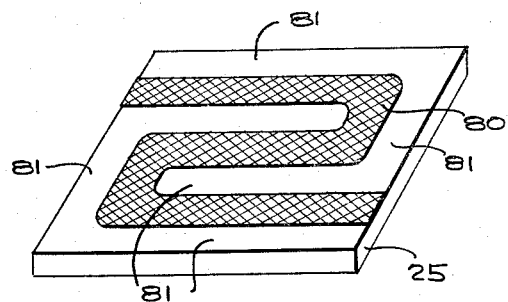
FIG. 13
FIG. 14
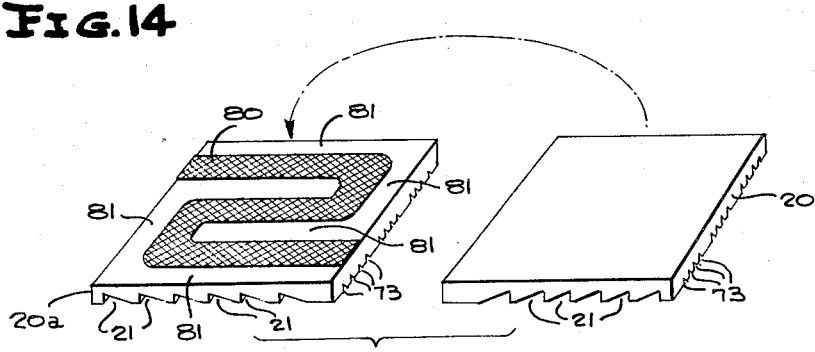
FIG. 15
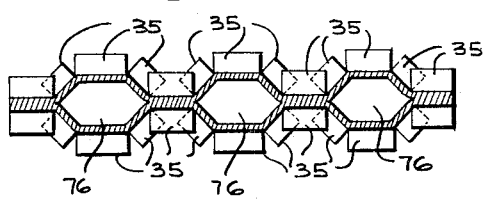
FIG. 16
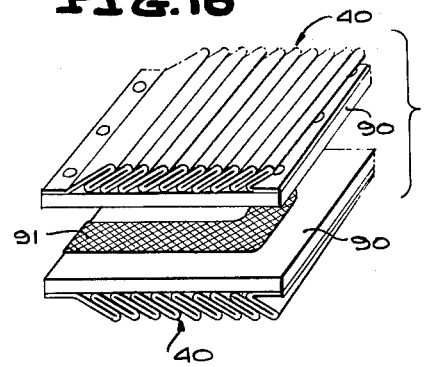
FIG. 17
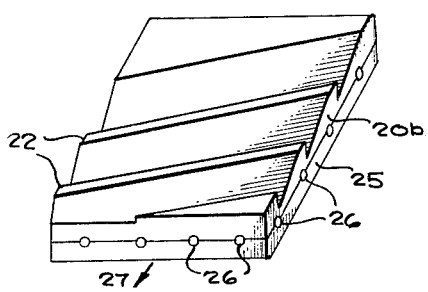
INVENTORS
ANTS HANSSON
& ROBERT M. BRICK
BY *Mason, Porter, Diller & Stewart*,
ATTORNEYS United States Patent Office 3,247,583
Patented Apr. 26, 1966

3,247,583
PRODUCTION OF EXTERNALLY FINNED
SHEET STOCK
Ants Hansson, Evanston, and Robert M. Brick, Hinsdale,
Ill., assignors to Continental Can Company, Inc., New
York, N.Y., a corporation of New York
Filed Mar. 21, 1962, Ser. No. 181,358
7 Claims. (Cl. 29—157.3)

This invention is concerned with the production of sheet stock having externally projecting fins which are integral with the base stock.

Sheets and other articles have been provided with projecting fins by cutting away the metal between the fins by milling or like operations or by extrusion; but the minimum thickness of the fin and its maximum projection are then limited by operational conditions. Also, fins have been provided by securing pre-formed individual fin elements to a base by welding, soldering or cementing; with the expense of the multiple operations and the difficulties of damaging valuable properties of the base stock and fin elements by the heat of welding or soldering, of having incomplete metal to metal union which is necessary for mechanical strength and uniform heat transfer.

According to the instant invention, articles having integral fins can be made by preparing a surface element having discontinuities, then integrating the same with a substrate by roll bonding, then rolling the assembly to produce a sheet of a predetermined thickness with surface scales integral therewith, and thereafter lifting such scales to form the external fins.

Such assemblies can be rolled by one or more passes with the surface discontinuities at right angles to the roll axes, for roll bonding and widening; and then the rolling completed with the residues of the discontinuities parallel to the roll axes. During the early passes, the rib metal spreads laterally into the groove spaces.

An object of the invention is the provision of such a simple method of forming an externally finned article.

Another object is the provision of such articles in which the body and fins are of different materials selected for their individual properties, such as stiffness for the fins and tensile strength for the base body, or atmospheric corrosion resistance for the fins and corrosion resistance to liquids for the base body.

Another object is the provision of the surface or scale-forming stratum by a simple folding or pleating operation.

With these and other objects in view, as will appear in the following description and claims, illustrative practices of the invention, and articles produced, are shown on the accompanying drawings, in which:

FIG. 1 is a perspective view of an assembly according to the invention, providing a billet for roll bonding and reduction;

FIG. 2 is a perspective view of a strip formed by rolling the assembly of FIG. 1;

FIG. 3 is a perspective view of part of an article formed by raising the scales of the strip of FIG. 2;

FIG. 4 is an exploded perspective view, showing the parts for a second form of assembly;

FIG. 5 is a perspective view of a strip rolled from the assembly of FIG. 4;

FIG. 6 is a perspective view of an article made by raising the scales of FIG. 5;

FIG. 7 is a perspective view of a third form of assembly;

FIG. 7A is a corresponding view of an alternative assembly;

FIG. 8 is a perspective view of an article from a strip made by rolling the assembly of FIG. 7;

FIG. 13 is a perspective view of a modified piece for use in FIG. 1;

FIG. 14 is a perspective view of assembling two pieces for rolling and producing an article having a tortuous passage therein;

FIG. 15 is a sectional view of such an article made by rolling the assembly of FIG. 14 with grooves in its outer surfaces as shown in FIG. 11;

FIG. 16 is a perspective view of two substrate and pleated sheet assemblies, in exploded form to show an anti-welding material on one assembly;

FIG. 17 is a perspective view of another form of piece for employment of FIGS. 1, 9 and 11.

Figure 9:
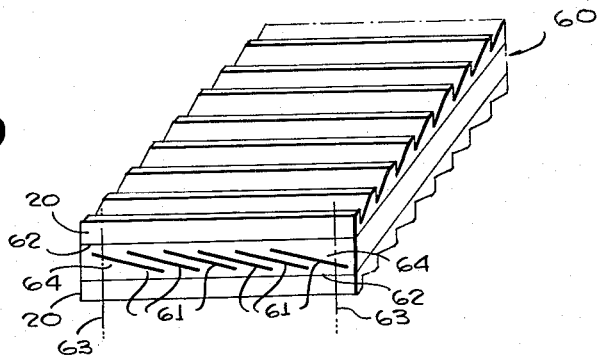
FIG. 9 is a perspective view of a fourth form of assembly.

FIGS. 1 to 3 show an illustrative practice of forming a solid sheet stock having external upstanding fins thereon. A fin-producing sheet or plate 20 is provided with parallel surface grooves 21 between which are the ribs 22. Such a sheet or plate can be made by milling the grooves therein, by rolling or coining to form the grooves, or by extrusion through a die having a serrated lip. This surfacing sheet or plate 20 is then placed upon a substrate sheet or plate 25 having a top surface conforming to the bottom surface of the surfacing stratum 20, e.g. both being plane, and is preferably secured thereto to prevent shifting, as by the tack welds 26 extending across the edges of the abutment areas. This assembly is then subjected to rolling, illustrated by the introduction in the direction of the arrow 27 into the nip of reduction rolls 28. The assembly can be heated, before the introduction, to a temperature at which roll-bonding occurs. For example, with aluminum, a temperature of 700 to 1100 degrees F. can be employed wherewith roll-bonding is produced upon a 50 percent reduction of the assembly thickness. Therewith, also, the ribs 22 are flattened and the metal thereof is caused to flow into the next succeeding groove 21 until the upper surface becomes essentially flat, and the grooves have apparently disappeared. However, the customary rolling lubricants, such as oils, are effective as resists to prevent roll-bonding between the metal of the ribs and the metal presenting the groove walls. According to this invention, the non-welding can be promoted by applying a resist to the upper surfaces of the stratum 20 before rolling. After a desired schedule of hot and cold rolling, the assembly is reduced to a strip S of predetermined thickness, as in FIG. 2, in which the rolled metal of the ribs now forms a series of scales 30 each of which is integral at portions 31 with the body 32 produced by the roll-bonding of the strata 20, 25 of FIG. 1, but are separated therefrom at the discontinuities 33 provided by the residues of the resists. Each scale 30 has a free edge 34 which is usually invisible in the rolled strip. Upon flexing the strip about a mandrel whose axis is parallel to the edges, as shown by the curved portion 32a of the body, each individual scale tends to remain straight as shown for the fin 30a and mechanical means can be employed to raise it to an acute angle such as the right angle in FIG. 3, relative to the flat body 32, so that the scales now provide the desired external fins 35. Alternatively, the raising of the scales can be started by shot-blasting, with the granules being directed against the surfaces of the scales so that the differential stress through the thickness of each scale causes them to bend and lift, as illustrated by the shot-blasting jets 44 in FIG. 5. The article of FIG. 3 has the surfaces 36 resulting from the sloping floors of the original grooves 21 of FIG. 1, but at a lesser angle to the roll-engaged surfaces. It will be noted that these surfaces 36 are not parallel to the bottom plane of the illustrated article of FIG. 3, but at an angle dependent upon the height of a fin 35 and its thickness at its junction 37 with the body 32. Each junction is curved in the illustration, with a fillet at one face which merges into one adjacent surface 36 and with a reentrant angle formed at the other face relative to the other adjacent surface 36.

In the practice according to FIGS. 4 to 6, two surface strata are provided, for forming a sheet having external fins projecting from both faces thereof. Such can be made by applying a surface stratum 20 to each side of the substrate 25 of FIG. 1. Further, FIG. 4 shows another method of forming such strata. In it, a sheet 40 is folded as angular or zigzag pleats 41 which illustratively may have the surfaces of the individual pleats at an acute angle to the surface of the base stratum 25, with the pleats thus overlapping one another. Before pleating, the outer surface of the sheet 40 can be coated with an anti-welding or resist material, e.g. by spray coating with aluminum oxide or other refractory. In FIG. 4, two such pleated surface strata 40 are being placed on the two surfaces of the base stratum or substrate 25, with the resist-coated surface toward the outside, and the clean metal surface toward the substrate, and preferably are connected thereto as by the spot-weldings at 42 of the ends of the sheets and by tack-welding to the base 25 as in FIG. 1 along the inner bights of the pleats. The assembly is then rolled as with FIG. 1. After the selected schedule of heating and rolling, a strip is produced as in FIG. 5, from which the surface scales at the two faces can be raised to provide the article of FIG. 6.

During the roll-bonding, the individual pleats or plies of the surfacing sheets 40 bond together at their clean abutting faces and their bights bond to the substrate, with the crevices becoming closed down to solid inter-bonded metal. The top surface is smoothed to the condition shown in FIG. 5, where the resist residues between what were the outer face of the original sheet are now almost invisible at their outer edges. The employment of shot-blasting by jet nozzles 44 is illustrative of the scale lifting to the dotted line position; and the final orientation of the raised fins may be fixed by mechanical bending tools.

As an example of practice with FIGS. 4 to 6, the sheet 40 was formed from aluminum of 8 mils thickness, the pleats being about ¼ inch wide. The base stratum or substrate was of 3003 aluminum alloy, and about ⅛ inch thick. Upon rolling for a reduction to about ⅕ of the original thickness of the assembly, the scales were raised to form fins integrally joined, being about 1 inch in height and spaced about 0.2 inch apart, with a root thickness of about 16 mils.

The procedure also can be employed in forming hollow articles having external fins. Thus in FIGS. 7 and 8 the body stratum or substrate 50 is formed of two sheets 51 joined at their longitudinal edges and having a layer 52 of resist material between their adjacent surfaces. Two pleated sheets 40 are applied to the faces of the body stratum 50, and roll-bonding and reduction are accomplished as before. To assure regularity during the rolling, it is preferred to have the lateral margins of greater thickness than the metal between the pleated sheets. This is attained in FIG. 7, by applying the two marginal pieces 51a alongside the respective pleated sheet 40, the pieces having thickness about twice the thickness of the material used to form the respective pleated sheet. The parts are tack-welded at the margins of the substrate 50, e.g. by the spot-welds 51b. An alternative is shown in FIG. 7A, where the material for the body stratum 50 is milled to provide a channel of the width of the respective pleated sheet 40, and about twice as deep as the thickness of the pleated stock and leaving marginal lands 51c. During rolling, the early pass or passes press and crease the pleated sheets down to the surfaces of the marginal pieces or lands, and thereafter the reduction is essentially regular across the width. During such rolling, the assembly is reduced to a uniform thickness across its length, noting that the portions of the base stratum 50 between the sheets 40 are more greatly reduced than the projecting edges of the base 50, but edge welding of the sheets 40 to the rising margins of base 50 does not occur by reason of rolling lubricant and the fact that the lateral pressures therebetween are less than the roll-bonding pressures in directions at right angles to the roll-engaged surfaces. After rolling, the scales can be raised to form the fins 35 at both faces; and the laminations 54 of the reduced substrate 50 can be separated and expanded to form a passage 55 which is closed at its lateral parts by the rolled residues of the margins 51.

Figure 10:
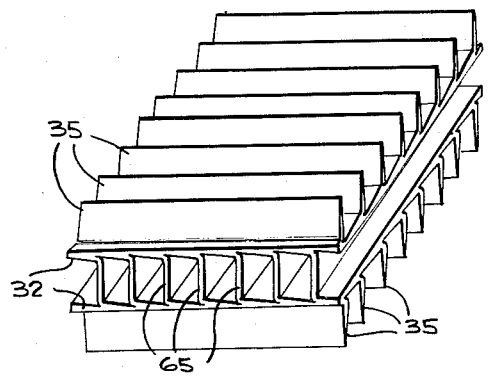
FIG. 10 is an article made from a strip rolled from the assembly of FIG. 9.

FIGS. 9 and 10 show another example of practice, in which the body stratum or substrate 60 has a plurality of sloping and overlapping internal channels 61 containing an anti-welding or resist material, and solid metal at the surface portions 62. Two surface strata 20 as in FIG. 1 are applied to the surface metal portions 62, and roll-bonding and reduction accomplished as before. The lateral edges of the rolled strip can then be trimmed, as represented by the lines 63, that is, through the residues of the sidemost channels 61; thereby affording access to the residues of the thicker portions 64. The metal portions at the bases of the two sets of fins are caused to move laterally relative to one another, whereby the reduced metal between the residues of the channels 61 now forms septa 65 which are integral with the strata providing bases for the fins 35 and hence with the fins themselves. The projecting edges of the body portions 62 with the scales thereon can be trimmed so their corners are alined as shown in FIG. 10. The surface scales can be raised as before to provide the external fins 35.

Figure 11:
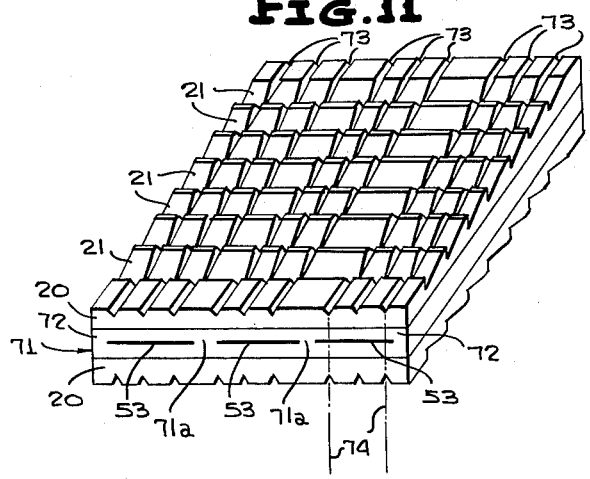
FIG. 11 is a perspective view of a fifth form of assembly.
Figure 12:
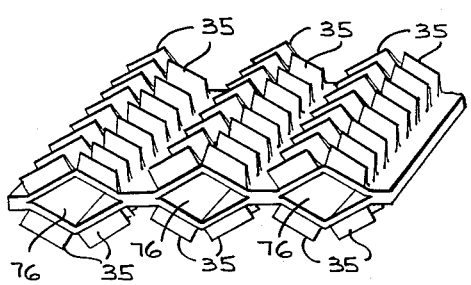
FIG. 12 is a perspective view of an article from a strip produced by rolling the assembly of FIG. 11.

In FIGS. 11 and 12, the body stratum or substrate 71 has a plurality of the longitudinal channels 53 as in FIG. 7, these being illustratively in a plane midway between the upper and lower faces of the stratum 71, with anti-welding or resist material therein, and being spaced apart by solid metal at 71a and likewise connected at the longitudinal margins 72. Two surface strata 20 are employed as in FIGS. 1 and 9; and roll-bonding and reduction accomplished. In the practice of FIGS. 11 and 12, longitudinal grooves 73 can be formed in the strata 20, to the depth of the grooves 21 of FIG. 1, above and below the internal resist channels 53. In the illustrated form, the longitudinal grooves 73 are of V-section, and are in sets of three opposite each of the internal channels 53, with the sidemost grooves of a set spaced inward from the channel edges as indicated by the lines 74. Upon rolling, the metal between the transverse grooves 21 is flattened to form scales as before, which extend from side to side, but are interrupted by the residues of the grooves 73, which have closed laterally so the walls of each groove are in contact but have not welded together. After rolling, the surface scales can be raised, and the body laminations at the residues of channels 53 separated as before. The residues of the grooves 73 have not welded during the rolling; the scales (FIG. 12) form fins 35 individually between such grooves, and the channels 76 formed by the expansion of the body laminations are polygonal, the polygonal legs being stiffened by the fins projecting from their outer surfaces. In FIG. 11, three grooves are illustrated at each channel 53, and correspondingly each of the channels 76 has two longitudinal rows of transverse fins 35 projecting from the two polygonal legs at each face of the article. In the form illustrated in FIG. 12, the scales present on the metal surfaces between sets of grooves, and at the margins of the rolled strip, have not been raised; but they also can be raised, to overlap the fins at each opened channel, as shown in FIG. 15.

Such products are useful as structural members for separating chambers between which heat exchange is desired; and in the hollow forms, one such chamber can be provided by the internal channel or cavity. In the latter case, there is economy over prior practices of forming fins as annuli and pressing them along pre-formed tubes.

The procedure described for FIG. 1 may be modified as in FIG. 13. One of the strata can have a pattern of resist material thereon, so that the roll-welding occurs only at the areas not covered by such resist. Thus in FIG. 13, the body stratum 25 has a pattern shown by the cross-hatching 80 printed thereon as a thin layer of refractory powder such as talc, held by a binder, and leaving the areas 81 free of such refractory. When employed as in FIGS. 1 to 3, the article has corresponding discontinuities between laminate parts of the body; and the fins can be raised, and the laminate portions moved apart by use of hydraulic internal pressure to provide a zigzag channel in the article, thus forming a heat exchanger, e.g. for refrigerating apparatus, having an internal fluid passage and external ribs.

In FIG. 14, the fin-forming stratum 20a has the pattern 80 thereon, and a second fin-forming stratum 20 is applied thereto as indicated by the curved arrow. After roll-bonding and reduction, the strip can have its fins raised and its channels expanded by hydraulic pressure to form an article as shown in section in FIG. 15, noting the separation of the transverse scales to form the longitudinal rows of fins 35 by use of grooves 73 as in FIG. 11.

FIG. 16 shows the production of hollow articles with external fins at both surfaces by employing pleated sheets 40 as in FIG. 4. In FIG. 16, two substrate sheets or body strata 90 are employed, with resist 91 between them except for areas which are to be joined. Thus the resist 91 may have the pattern 80 of FIGS. 13 and 14, or may extend longitudinally from end to end as with the resists 53 of FIGS. 7 and 11. Upon roll-bonding and reduction, the surface scales can be raised as external fins and the body laminations moved apart to provide the passage spaces, as before.

It will be understood that the scales and the fins therefrom can extend in any desired direction relative to that of rolling. When high fins are to be made, grooved strata 20 as in FIGS. 1, 9, 13 and 14 should receive at least initial rolling passes with the grooves parallel to the roll axes. The amount of overlap of the pleats of sheets 40 is a major factor for fin height, and such can be rolled in either direction. Thus FIGS. 4-6 show the forming of fins parallel to the rolling direction. FIG. 17 shows a fin-forming stratum 20b on a base 25, in which the ribs 22 are at an acute angle to the rolling direction for the assembly, as shown by the arrow 27. During the rolling, this relative angle changes, due to the lengthening of the assembly as its thickness decreases: and upon raising, the fins can be at the desired angle.

In practice, the areas which are to be bonded should be clean. Such a condition can be established by solvent degreasing, followed by mechanical scouring as by wire brushing, and with the assembly and bonding effected before surface contamination or oxidation can inhibit strong bonds. When the material is a stainless steel, it is desirable to apply thin platings of nickel at the areas to be abutted and bonded.

The discontinuities from the external surfaces can be safeguarded against undesired welding by the usual rolling lubricants in some cases, particularly where the rolling is largely for welding, e.g. about 50 percent. In other cases, it is preferred to assure against roll-bonding by use of a resist. Thus, for FIG. 1, the entire upper surface of stratum 20 can be flame-sprayed with talc, magnesium oxide, sodium chloride, aluminum oxide, or other refractory: and a like coating can be employed for the outward surfaces of sheets 40 of FIG. 4. Silicone grease may be used. When electrochemical corrosion is not a problem in use, graphite in a binder vehicle can be employed.

A feature of the method is that the final rolling steps can be in the cold, and a variable work-hardening effect produced and maintained.

By making the body strata of FIGS. 7-12 of a material, e.g. pure aluminum, which has a high resistance to corrosion, and making the surface or fin-forming strata of a material, e.g. an aluminum alloy, which has a high work-hardening strength, the composite article has its parts integrated for heat transfer and yet the thin fins have adequate mechanical resistance. In production of hollow articles, the body strata can be of an alloy steel which resists corrosion by the fluid to be passed therethrough, and the surface strata can be of a different, e.g. cheaper, alloy which resists atmospheric conditions adequately: noting that such can be selected to show high structural strength of the fins upon heat treatment.

The process can be employed with other materials which are capable of rolling: for example, copper fins can be formed monolithically with a copper-base alloy sheet or tube.

The illustrative examples are not restrictive; and the invention can be practiced in many ways within the scope of the appended claims.

What is claimed is:

1. The method of making a structure having projecting integral fins, which comprises placing at least two bodies in surface-to-surface contact, one of said bodies having discontinuities in its exposed surface, welding the bodies together under heat and pressure and rolling whereby the material between the discontinuities forms surface scales on the said one body, and lifting the scales with bending of their roots and thereby forming integral fins extending from the roll-reduced and welded bodies, said one body being a zigzag folded sheet of metal, and the discontinuities being the outwardly open regions between adjacent folds.

2. The method as in claim 1, in which said one body is provided originally in the form of a sheet, an anti-weld coating is provided on one face of the sheet, the sheet is then folded in zigzag, and the folded sheet is then placed in surface contact with another said body with the coated face at the outside and a clean face in such contact.

3. The method of making a structure having projecting integral fins, which comprises placing three bodies in surface-to-surface contact, the outer two bodies each having discontinuities at their respective exposed surfaces, welding the bodies together under heat and pressure and rolling whereby the material between the discontinuities forms surface scales on said two outer bodies, and lifting the scales with bending of their roots and thereby forming integral fins extending from the roll-reduced and welded bodies.

4. The method of making a structure having projecting integral fins, which comprises placing at least two bodies in surface-to-surface contact, one of said bodies having discontinuities in its exposed surface, welding the bodies together under heat and pressure and rolling whereby the material between the discontinuities forms surface scales on the said one body, and lifting the scales with bending of their roots and thereby forming integral fins extending from the roll-reduced and welded bodies, the second body having an internal discontinuity extending from end to end thereof, and the walls of said internal discontinuity being moved apart to form an enclosed channel after the bodies have been rolled.

5. The method as in claim 4, in which the said one body has its discontinuities in the form of parallel grooves at the exposed surface thereof extending at angles to said internal discontinuity and other external discontinuities extending parallel to said internal discontinuity, and in which said other external discontinuities provide breaks in the scales formed by the material between the said grooves, said other external discontinuities being located opposite said internal discontinuity whereby the said breaks cause the scales to form longitudinal rows of fins with at least one row opposite the internal channel and another row located laterally relative to said internal channel.

6. The method of making a structure having projecting integral fins, which comprises placing at least two bodies in surface-to-surface contact, one of said bodies having discontinuities in its exposed surface, welding the bodies together under heat and pressure and rolling whereby the material between the discontinuities forms surface scales on the said one body, and lifting the scales with bending of their roots and thereby forming integral fins extending from the roll-reduced and welded bodies, the second body having a plurality of inclined and overlapping internal discontinuities, and the faces of the roll-reduced and welded body being displaced laterally relative to one another whereby internal channels are formed with the material between the internal discontinuities forming septa between said channels.

7. The method of making a structure having projecting integral fins, which comprises placing at least two bodies in surface-to-surface contact, one of said bodies having discontinuities in its exposed surface, applying a coating of anti-weld substance to said exposed surface of said one body, then welding the bodies together under heat and pressure and rolling whereby the material between the discontinuities forms surface scales on the said one body, and lifting the scales with bending of their roots and thereby forming integral fins extending from the roll-reduced and welded bodies.

References Cited by the Examiner

UNITED STATES PATENTS

| | | |
|---|---|---|
| 377,317 | 1/1888 | Marshall. |
| 503,983 | 8/1893 | Palmer _____ 29—187.5 |
| 2,468,206 | 4/1949 | Keene _____ 29—187.5 |
| 2,711,382 | 6/1955 | Smith-Johannsen __29—157.3 XR |
| 2,999,305 | 12/1961 | Reynolds _____ 29—157.3 |
| 3,034,204 | 5/1962 | Grenell et al. _____ 29—157.3 |
| 3,058,181 | 10/1962 | Brick. |
| 3,092,470 | 6/1963 | Ripling _____ 29—528 XR |
| 3,136,037 | 6/1964 | Solnick et al. _____ 29—157.3 |

FOREIGN PATENTS

| | | |
|---|---|---|
| 216,766 | 8/1958 | Australia. |
| 1,191,345 | 4/1959 | France. |

WHITMORE A. WILTZ, *Primary Examiner.*

NEDWIN BERGER, *Examiner.*